(12) United States Patent
Hayashi

(10) Patent No.: US 7,911,108 B2
(45) Date of Patent: Mar. 22, 2011

(54) STATOR OF ELECTRIC ROTATING MACHINE

(75) Inventor: Noriyuki Hayashi, Okazaki (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 12/547,777

(22) Filed: Aug. 26, 2009

(65) Prior Publication Data

US 2010/0052465 A1   Mar. 4, 2010

(30) Foreign Application Priority Data

Aug. 29, 2008   (JP) ................. 2008-220863

(51) Int. Cl.
*H02K 1/06* (2006.01)
*H02K 1/00* (2006.01)

(52) U.S. Cl. ... 310/216.009; 310/216.001; 310/216.007; 310/216.008; 310/216.011; 310/216.013; 310/216.015

(58) Field of Classification Search ........... 310/216.001, 310/216.009, 258, 216.007–216.008, 216.011, 310/216.013, 216.015
See application file for complete search history.

(56) References Cited

U.S. PATENT DOCUMENTS 6,836,051 B2 * 12/2004 Hiwaki et al. ............. 310/254.1
2004/0036367 A1 * 2/2004 Denton et al. ................. 310/61

FOREIGN PATENT DOCUMENTS

| JP | 2002-51485 | | 2/2002 |
| JP | 2002051485 A | * | 2/2002 |
| JP | 2002204556 A | * | 7/2002 |
| JP | 2005237136 A | * | 9/2005 |

OTHER PUBLICATIONS

Machine Translation JP2005237136 (2005) and JP20040036367 (2004).*
Machine Translation JP2002204556 (2002).*

* cited by examiner

*Primary Examiner* — Quyen Leung
*Assistant Examiner* — Jose A Gonzalez Quinones
(74) *Attorney, Agent, or Firm* — Nixon & Vanderhye PC

(57) ABSTRACT

The stator of an electric rotating machine includes a stator core constituted of a plurality of core pieces joined to one another in a ring, a plurality of phase windings wound around the stator core, the stator core and the phase windings constituting a core assembly body, and an outer casing into which the core assembly body is fitted. Gaps are provided between an outer periphery of the core assembly body and an inner periphery of the outer casing.

6 Claims, 12 Drawing Sheets

STATOR OF ELECTRIC ROTATING MACHINE

CROSS-REFERENCE TO RELATED APPLICATION

This application is related to Japanese Patent Application No. 2008-220863 filed on Aug. 29, 2008, the contents of which are hereby incorporated by reference.

BACKGROUND OF THE INVENTION

1. Field of the Invention

The present invention relates to a stator of an electric rotating machine, the stator being constituted of core pieces fitted to an outer casing by shrink-fitting, for example.

2. Description of Related Art

In recent years, there is a growing need for compact and high-quality electric rotating machines usable as an electric motor or an alternator.

One of the reasons is that the space for accommodating an electric rotating machine mounted on a vehicle is becoming smaller and smaller, while the output required of the electric rotating machine is becoming higher and higher.

It is known to dispose circumferentially divided core pieces of a stator core in a ring, and fitting these core pieces to a cylindrical casing at their outer circumference. For example, refer to Japanese Patent Application Laid-open No. 2002-51485.

This document discloses using a shrink-fitting method to fit the core pieces disposed in a ring to the cylindrical casing. In this method, a cylindrical casing whose inner diameter is slightly smaller than the outer diameter of the ring of the core pieces is set in place, and then the ring assembly of the core pieces is fitted into the cylindrical casing which is being heated so that its inner diameter expands. After completion of the shrink-fitting, the ring assembly of the core pieces and the cylindrical casing are fixed to each other by the stress due to difference between their diameters.

Meanwhile, as one of the methods to manufacture a stator coil constituted of continuous coil wires, the following method is known.

In this method, first, a plurality of shaped bodies each of which is constituted of parallel straight portions and turn portions each of which connects adjacent straight portions are formed from electrically conductive wire. Next, these shaped bodies are assembled together to form an assembly body.

The assembly body has a structure in which a plurality of shaped body pairs each constituted of two of the shaped bodies are arranged along the longitudinal direction of the assembly body. Each of the shaped body pairs includes a plurality of straight overlap portions extending along the longitudinal direction of the assembly body, Each of the straight overlap portions is formed from the straight portions of one of the shaped bodies and the straight portions of another one of the shaped bodies which are overlapped with one another.

Accordingly, the assembly body has a structure in which a plurality of straight overlap portions are arranged along the longitudinal direction of the assembly body. Finally, the assembly body is rolled around a core member several turns to form a roll body. The roll body includes a plurality of straight laminate portions arranged in the circumferential direction, each of the straight laminate portions being formed from the straight overlap portions laminated in the radial direction of one of the shaped body pairs.

The thus obtained roll body is used as a stator coil of a cylindrical cage shape. When such a stator coil is assembled into a stator core, the straight laminate portions are disposed inside the slots of the stator core, and the turn portions are disposed outside the slots.

However, it is exceedingly difficult to assemble the stator coil of a cylindrical cage shape into a stator core of a rigid core shape. Accordingly, it is common that a plurality of core pieces are assembled into the stator core of a cylindrical cage shape from outside the stator core, and then fitted into an outer casing to obtain a stator. The fitting into the outer casing is performed by use of a shrink fitting method in which the outer casing is heated to expand.

In this method, a cylindrical casing whose inner diameter is slightly smaller than the outer diameter of the ring assembly of the core pieces is set in place, and then the ring assembly of the core pieces is fitted into the cylindrical case which is being heated so that its inner diameter expands. After completion of the shrink-fitting, the ring assembly of the core pieces and the cylindrical casing are fixed to each other by the stress due to difference between their diameters. The stress between the ring assembly of the core pieces and the cylindrical casing increases with the increase of the clamping margin which is the value of outer diameter of the ring assembly of the core pieces less the value of the inner diameter of the cylindrical casing.

The clamping margin is set to such a value to obtain a necessary stress between the ring assembly of the core pieces and the cylindrical casing. However, since the components of the stator are manufactured with some manufacturing tolerance, it is not possible to exactly achieve the desired value of the clamping margin. When the manufacturing tolerance is set larger, although the components can be manufactured easily, the following problems occur.

If the clamping margin becomes large due to the large manufacturing tolerance, since the stress between the ring assembly of the core pieces and the outer casing becomes larger than necessary, and the core pieces are applied with excessively large clamping force at their abutting portions in the circumferential direction, magnetic loss of the stator may excessively increase.

In addition, in this case, there occur other problems including deformation, variation of the diameter, and degradation of the roundness of the ring assembly of the core pieces.

Furthermore, when the manufacturing tolerance is large, since the variation of the stress between the ring assembly of the core pieces and the outer casing becomes large, the stator-to-stator performance (magnetic loss) variation becomes large.

SUMMARY OF THE INVENTION

The present invention provides a stator of an electric rotating machine comprising:

a stator core constituted of a plurality of core pieces joined to one another in a ring;

a plurality of phase windings wound around the stator core;

the stator core and the phase windings constituting a core assembly body; and an outer casing into which the core assembly body is fitted;

wherein gaps are provided between an outer periphery of the core assembly body and an inner periphery of the outer casing.

The present invention allows large manufacturing tolerance of the components of a stator having a core assembly body including a stator core and phase windings, and an outer casing into which the core assembly body is fitted, while preventing the stress between the core assembly body and the outer casing from becoming exceedingly large.

Other advantages and features of the invention will become apparent from the following description including the drawings and claims.

PREFERRED EMBODIMENTS OF THE INVENTION

First Embodiment

Figure 1:
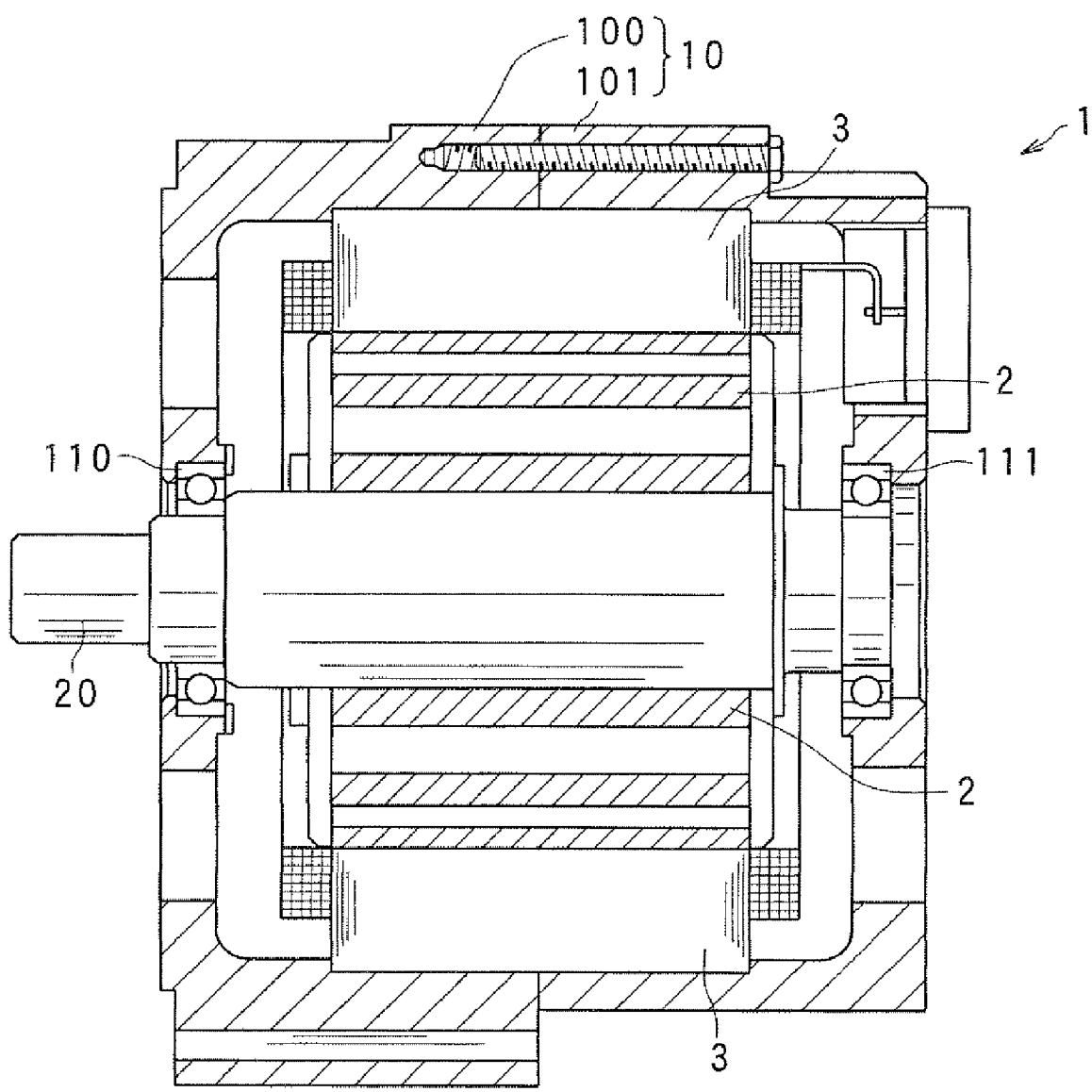
FIG. 1 is an axial cross-sectional view showing a structure of an electric rotating machine including a stator according to a first embodiment of the invention.

FIG. 1 is an axial cross-sectional view showing a structure of an electric rotating machine 1 including a stator according to a first embodiment of the invention.

As shown in this figure, the electric rotating machine 1 includes a housing 10 constituted by a pair of housing members 100 and 101 each having a bottomed tubular shape and joined to each other at their opening portions, a rotor 2 fixed to a rotating shaft 20 retractably supported by the housing 10 through bearings 110 and 111, and a stator 3 fixed to the housing 10 so as to surround the rotor 2 inside the housing 10.

The rotor 2 is provided with a plurality of magnet poles (S poles and N poles) formed in the outer periphery of the rotor 2 facing the inner periphery of the stator 3, such that different poles alternate in the circumferential direction of the rotor 2. In this embodiment, an 8-pole (four N poles and four S poles) rotor is used as the rotor 2.

Figure 2:
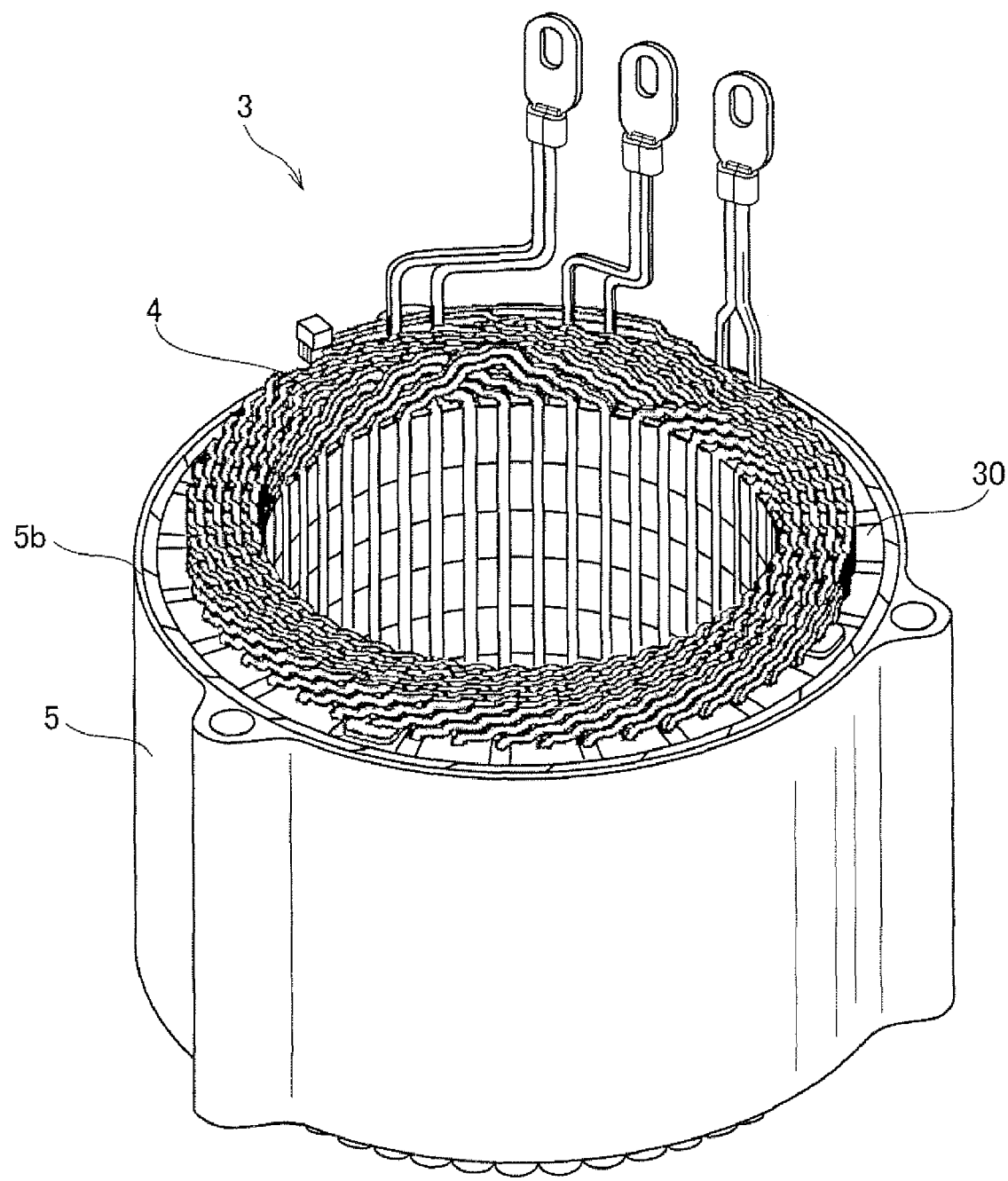
FIG. 2 is a plan view of the stator according to the first embodiment of the invention.

As shown in FIG. 2, the stator 3 includes a stator core 30, a three-phase stator coil 4 constituted by a plurality of phase windings, and an outer casing 5 fitted to the stator core 30. As explained in detail later, between the stator core 30 and the outer casing 5, gaps are formed as slits 5b provided in the inner periphery of the outer casing 5.

Figure 3:
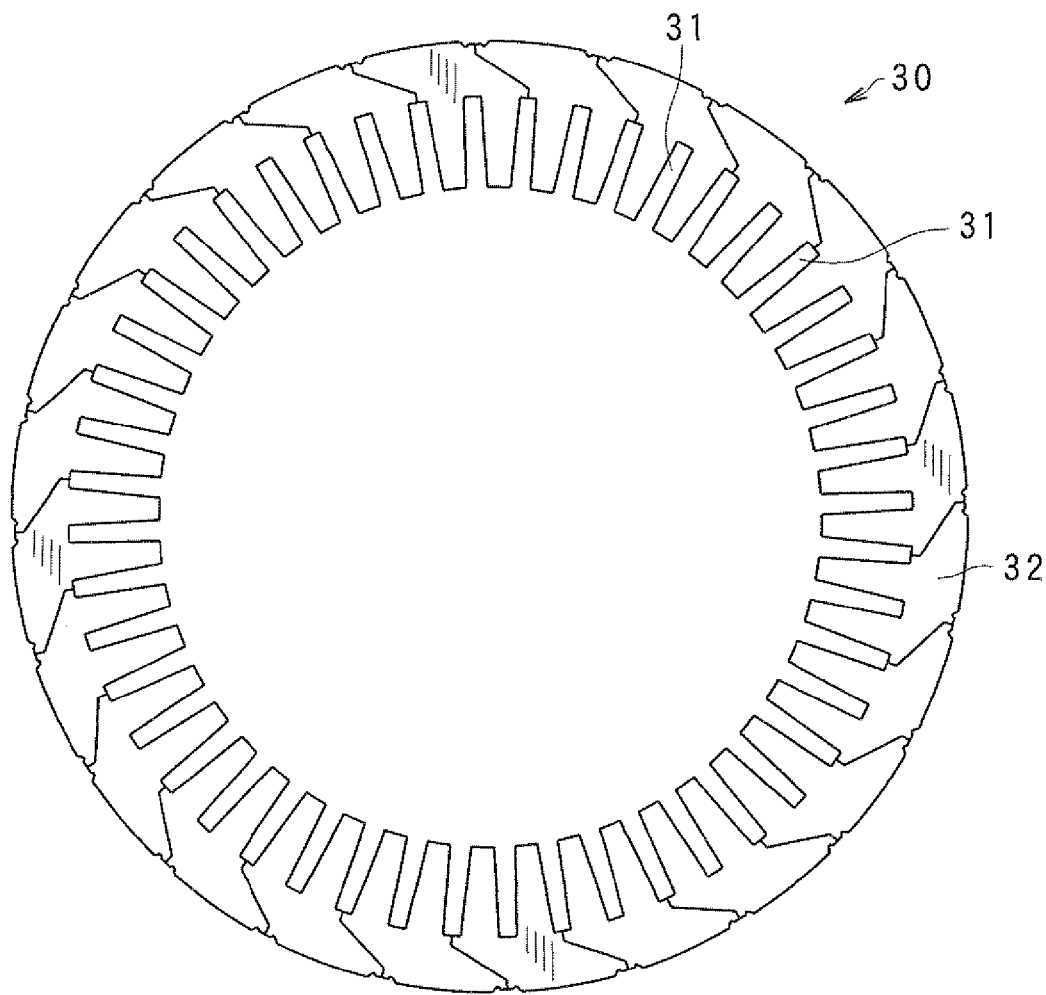
FIG. 3 is a plan view of a stator core of the stator shown in FIG. 2.

As shown in FIG. 3, the stator core 30 has a shape of a circular ring formed with slots 31 at its inner periphery. The depth direction of the respective slots 31 coincide with the radial direction of the stator core 30. The stator core 30 is formed with two slots 31 for each pole of the stator 2 for each one of the phases of the stator coil 4. In this embodiment, the total number of the slots 31 is 48 (=8×3×2).

Figure 4:
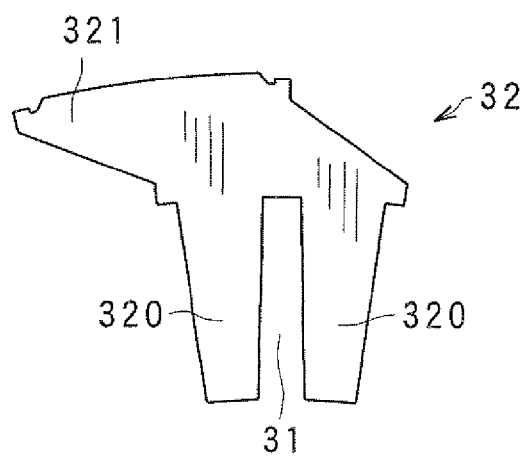
FIG. 4 is a plan view of one of core pieces constituting the stator core shown in FIG. 3.

The stator core 30 is constituted of a predetermined number of (twenty four in this embodiment) core pieces 32 circumferentially joined to one another. As shown in FIG. 4, the core piece 32 has a shape to define one slot 31 itself, and define another slot 31 with a circumferentially adjacent core piece 32. The core piece 32 is constituted including a pair of tooth portions 320 extending radially inwardly, and a back core portion 321 connecting these tooth portions 320 at a radially outward position.

The core pieces 32 are formed by laminating electromagnetic steel plates. Between each adjacent two of the laminated electromagnetic steel plates, an insulating thin film is interposed. The core pieces 32 may be formed by laminating metal thin plates other than electromagnetic steel plates, while interposing an insulating thin film between each adjacent two of the metal thin plates.

The shape of the stator core 30 is not limited to the one shown in FIG. 3. For example, the stator core 30 may have a shape shown in FIGS. 5 and 6.

Figure 5:
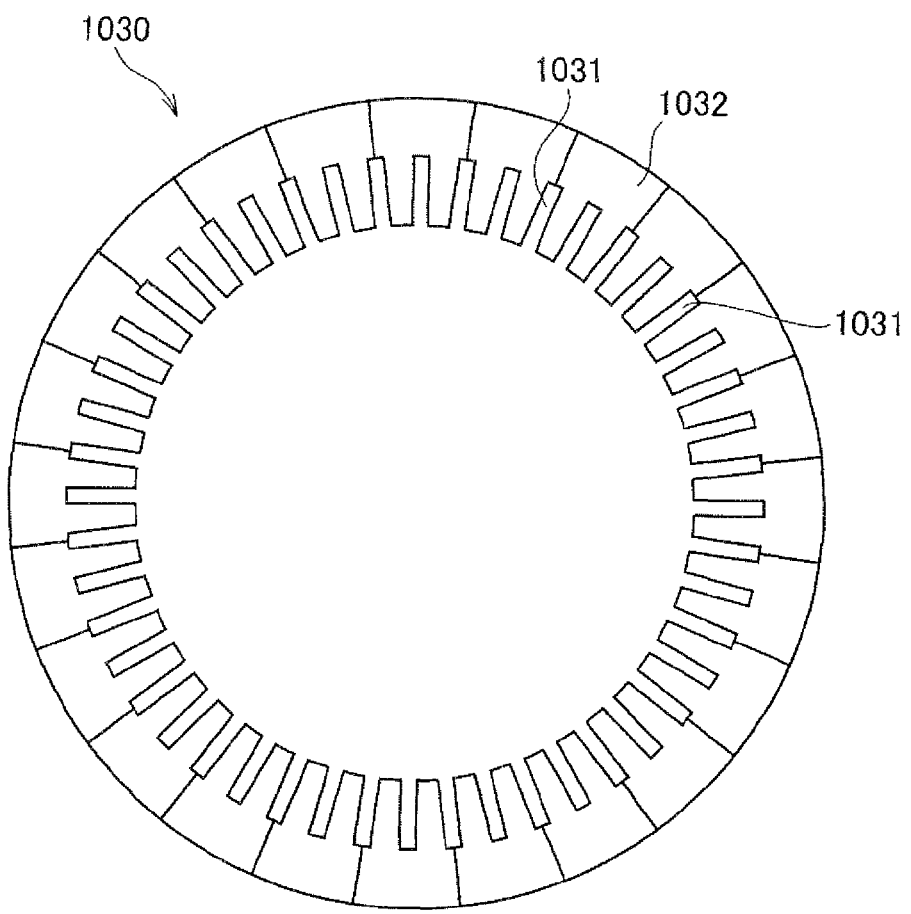
FIG. 5 is a plan view of a modification of the stator core shown in FIG. 3.
Figure 6:
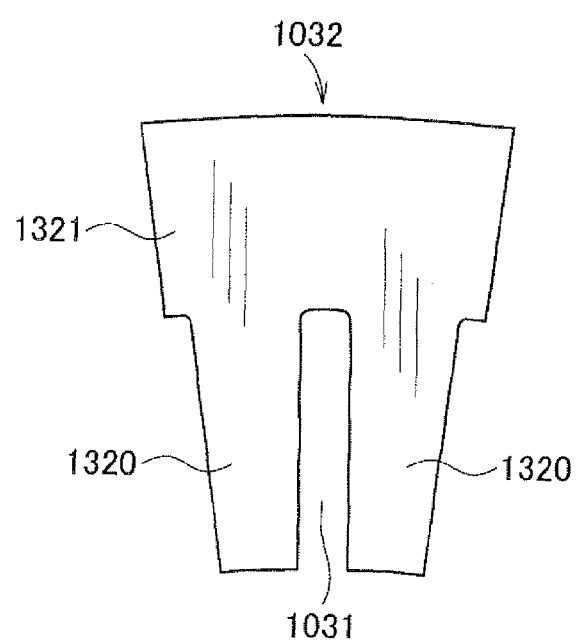
FIG. 6 is a plan view of one of core pieces constituting the modification of the stator core shown in FIG. 5.

The stator core 1030 having the circular ring shape shown in FIGS. 5 and 6 is constituted of core pieces 1032 circumferentially joined to one another. The core piece 1032 is constituted including a pair of tooth portions 1320 extending radially inwardly, and a back core portion 1321 connecting these tooth portions 1320 at a radially outward position. Each core piece 1032 defines one slot 1031, and another slot 1031 with a circumferentially adjacent core piece 1032. That is, one slot 1031 is defined by a pair of radially inwardly extending tooth portions 1320 of one core piece 1032, or by one of the tooth portions 1320 of one core piece 1032 and one of the tooth portions 1320 of another core piece 1032. In this example, the core piece 1032 has such a shape that the back core portion 1321 of one core piece 1032 does not radially overlap with circumferentially adjacent core pieces 1032. The number and material of the core pieces 1032 are the same as those of the core pieces 32 shown in FIG. 4.

Figure 7A:
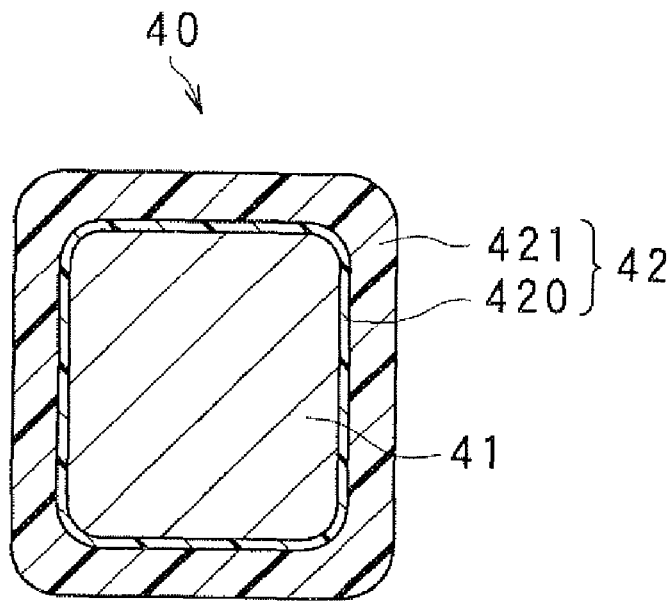
FIG. 7A is a cross-sectional view of windings constituting a stator coil wound on the stator core of the stator according to the first embodiment of the invention.

The stator coil 4 is constituted of a plurality of windings 40 wound together in a given way. As shown in FIG. 7A, each of the windings 40 includes a copper conductor 41, and an insulating film 42 constituted of an inner layer 420 and an outer layer 421 covering the outer surface of the conductor 41 for insulation.

Since the insulating film 42 is sufficiently thick, it is not necessary to interpose insulating paper or the like between each adjacent two of the wirings 40 for insulation therebetween. However, insulating paper or the like may be interposed between each adjacent two of the wirings 40 or between the stator core 30 and the stator coil 4.

Figure 7B:
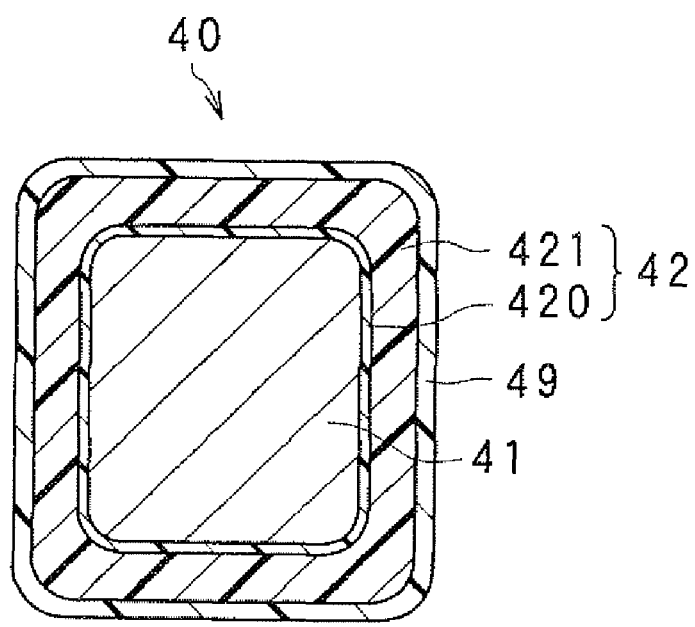
FIG. 7B is a cross-sectional view of a modification of the stator coil shown in FIG. 7A.

As shown in FIG. 7B, the outer surface of the insulating film 42 may be coated with a fusion member 49 made of fusion material such as epoxy resin. The fusion member 49 melts at an earlier time than the insulating film 42 when the electric rotating machine 1 generates heat, and accordingly, the windings 40 accommodated in the same slot 31 heat-adhere to one another through their fusion members 49. As a result, since the windings 40 accommodated in the same slot 31 become integrated and rigid, the mechanical strength of the windings 40 increases.

Figure 8:
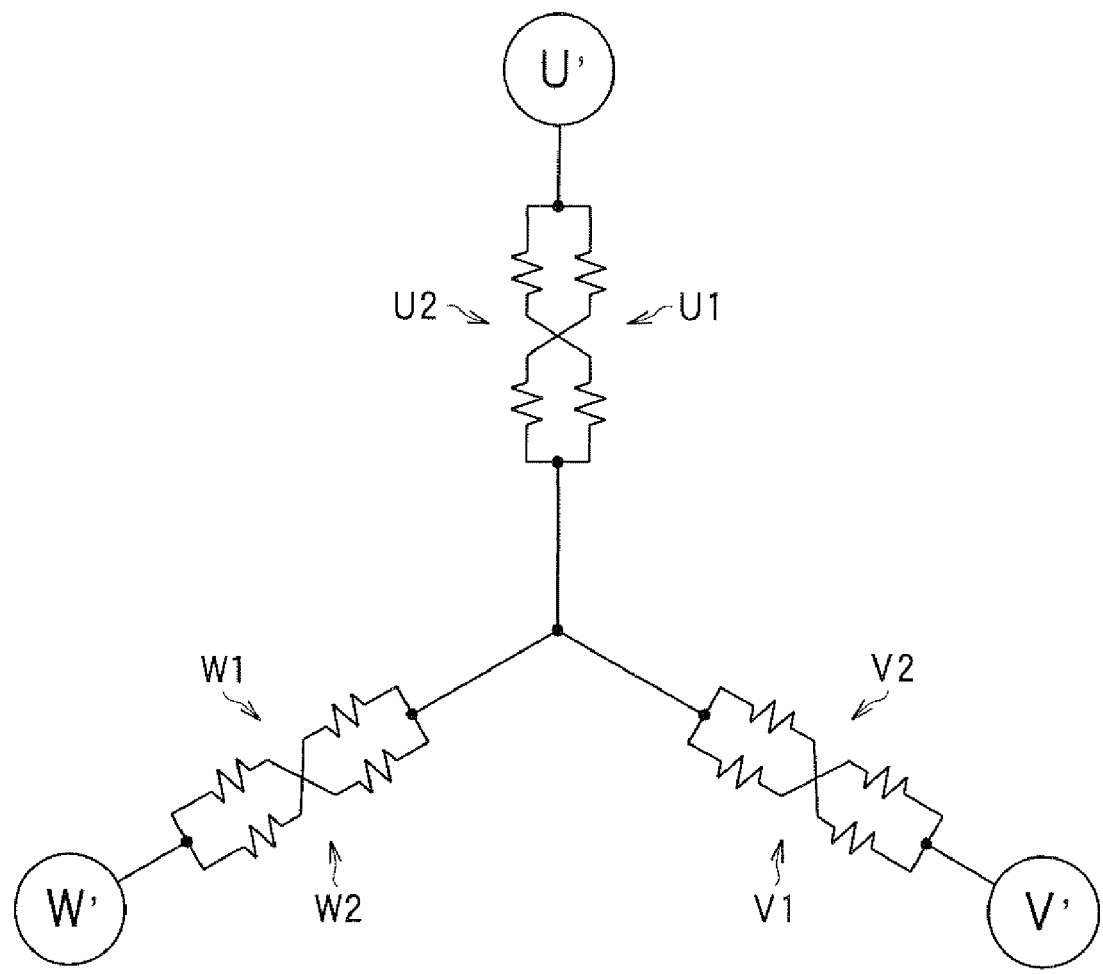
FIG. 8 is a diagram for explaining electrical connection of the windings constituting the stator coil of the first embodiment of the invention.

In this embodiment, as shown in FIG. 8, the stator coil 4 is constituted of two sets of three-phase windings (windings U1, U2, V1, V2, W1 and W2).

Figure 9:
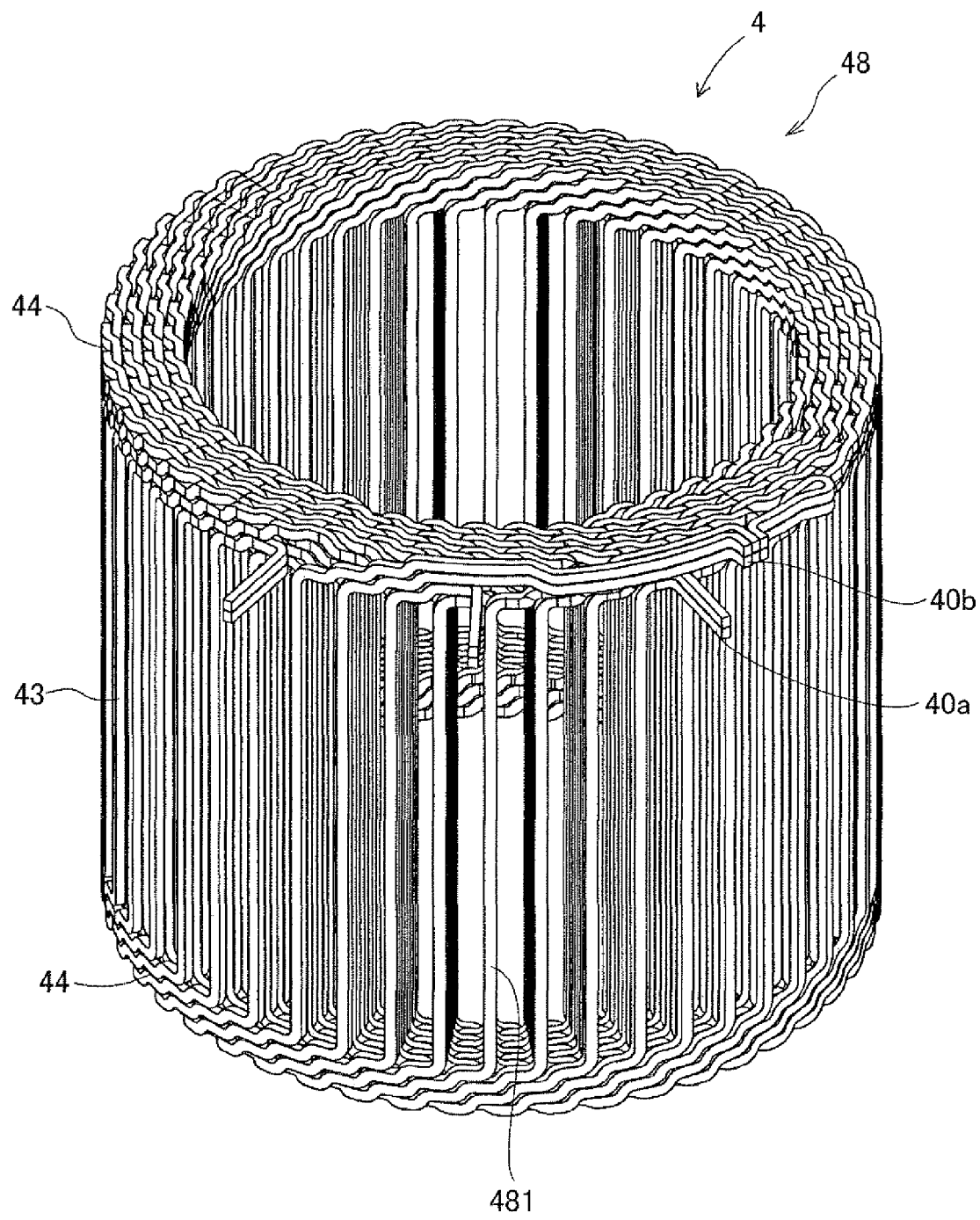
FIG. 9 is a perspective view of a roll body forming the stator coil of the first embodiment of the invention.

As shown in FIG. 9, the stator coil 4 is a roll body 48 formed by rolling an assembled body 47 (see FIG. 10) formed by assembling the windings 40 in a predetermined shape. Each of the windings 40 constituting the stator coil 4 is wave-wound along the circumferential direction on the side of the inner periphery of the stator core 30.

Each of the windings 40 includes in-slot portions 43 of a linear shape accommodated in the slots 31, and turn portions 44 connecting the adjacent in-slot portions 44 to each other. The in-slot portions 44 of the same winding 40 are accommodated in every predetermined number of the slots 31 (every six slots 31 in this embodiment). The turn portions 44 project from the axial ends of the stator core 30.

Each of the windings 40 is wave-wound along the circumferential direction with both ends thereof being projected from the axial ends of the stator core 30. Each one of the phases of the stator coil 4 is formed from two of the windings 40 (referred to as a "first winding 40a" and a "second winding 40b" hereinafter) which are connected to each other at their one ends.

The in-slot portions 43 of the first winding 40a and the in-slot portions 43 of the second winding 40b are accommodated in the same slots 31 such that they alternate in the depth direction in each of the slots. The portion at which the first and second windings 40a and 40b are connected to each other (referred to as a connecting portion 45 hereinafter) is formed at a turn-round portion 46 constituted by a specific one of the in-slot portions 44 at which the winding direction is reversed.

Figure 10:
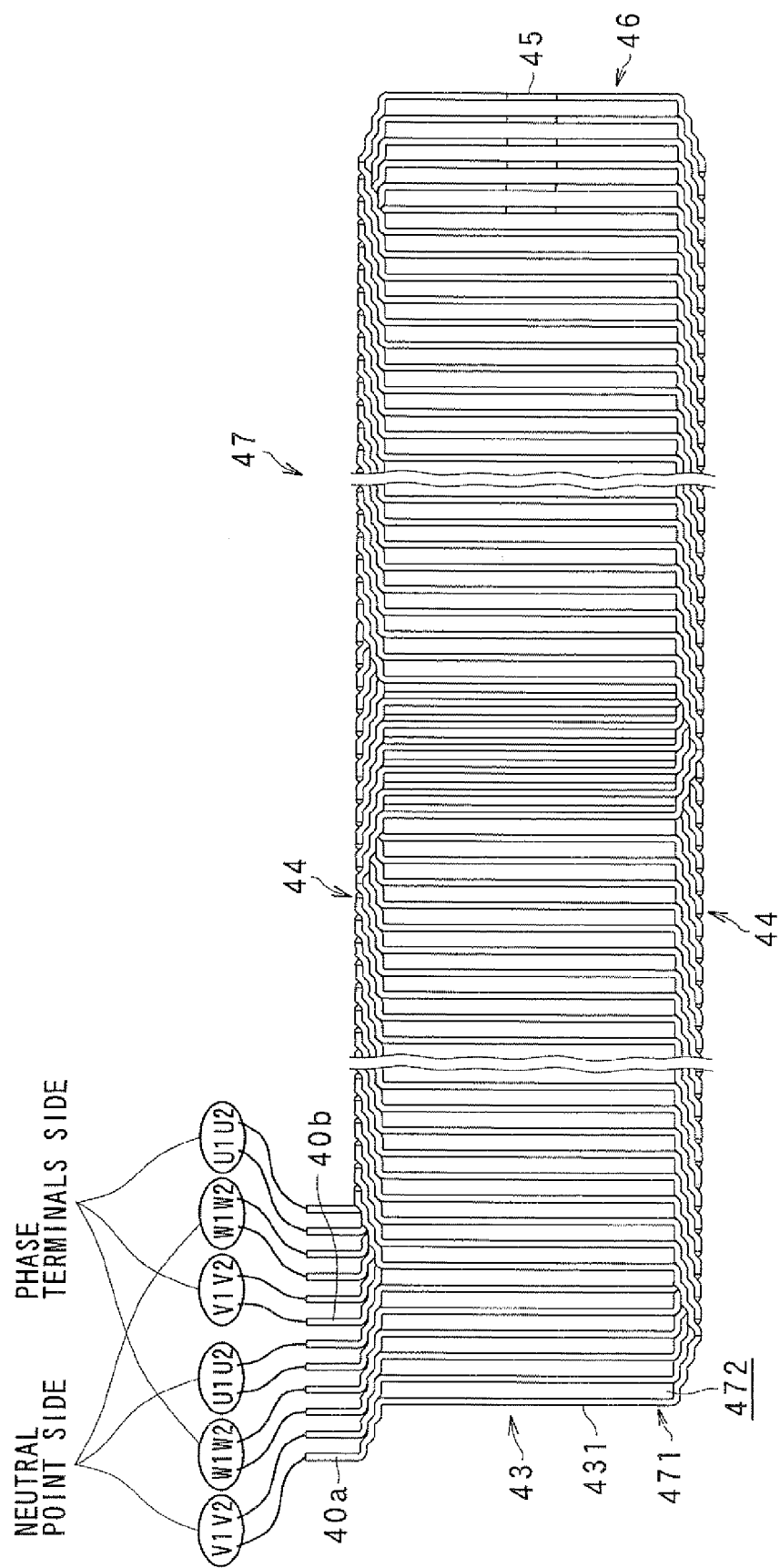
FIG. 10 is a development view of the stator coil of the first embodiment of the invention.

FIG. 10 is a development view of the stator coil 4, or a plan view of the assembled body 47 before being rolled. The stator coil 4 is constituted of six wire assemblies each including the first and second windings 40a and 40b having different winding directions. The six wire assemblies constitute 2 sets of three phase windings (U1, V1, W1 and U2, V2 and W2). In each wire assembly, one end of the first winding 40a on the side opposite to the neutral point side (or on the side of the phase terminal) is connected to one end of the second winding 40b on the side of the phase terminal (or on the side opposite to the neutral point) at the in-slot portion forming the turn-round portion 46.

Figure 11:
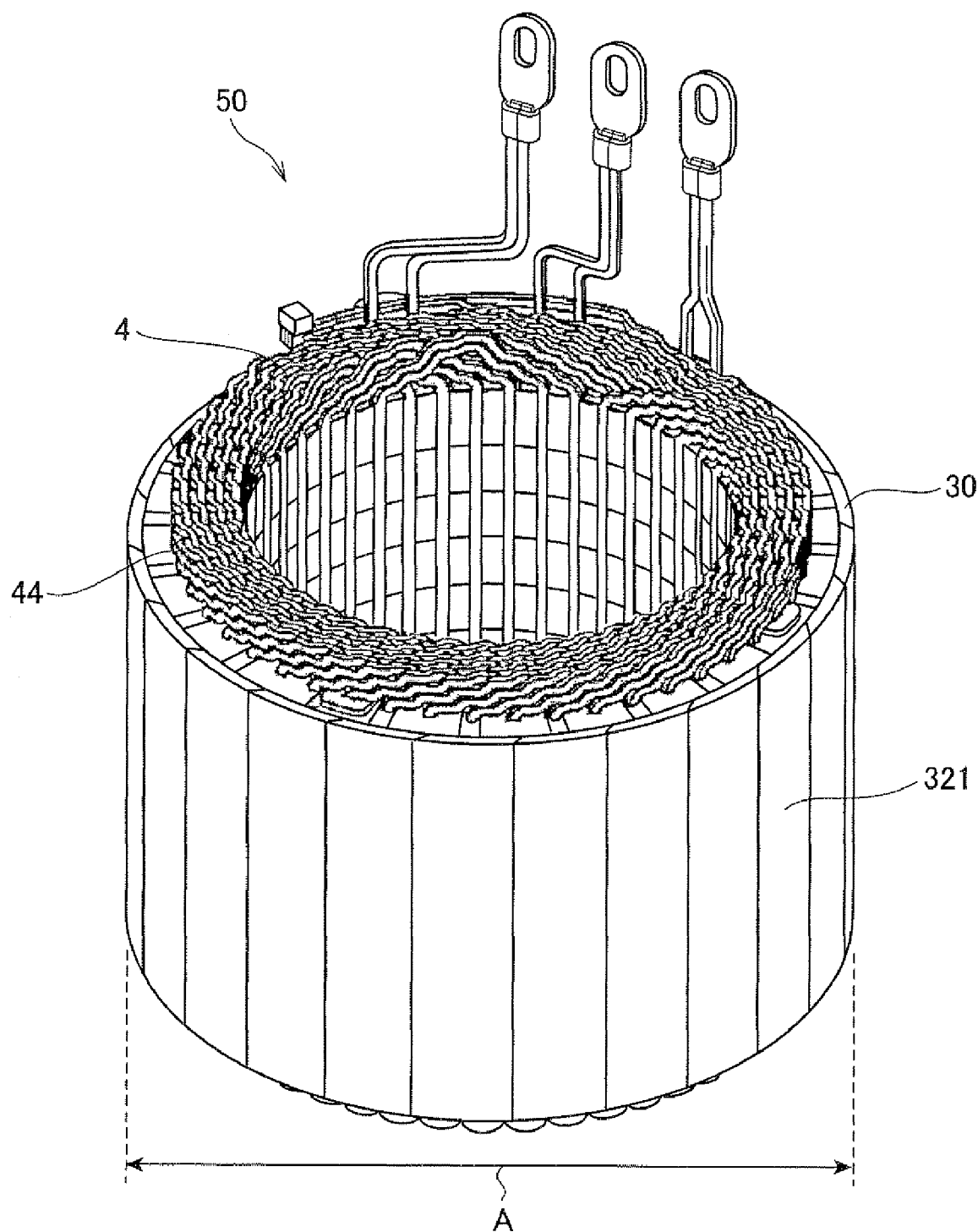
FIG. 11 is a perspective view of a core assembly body constituted of the stator core and the stator coil of the first embodiment of the invention.
Figure 12:
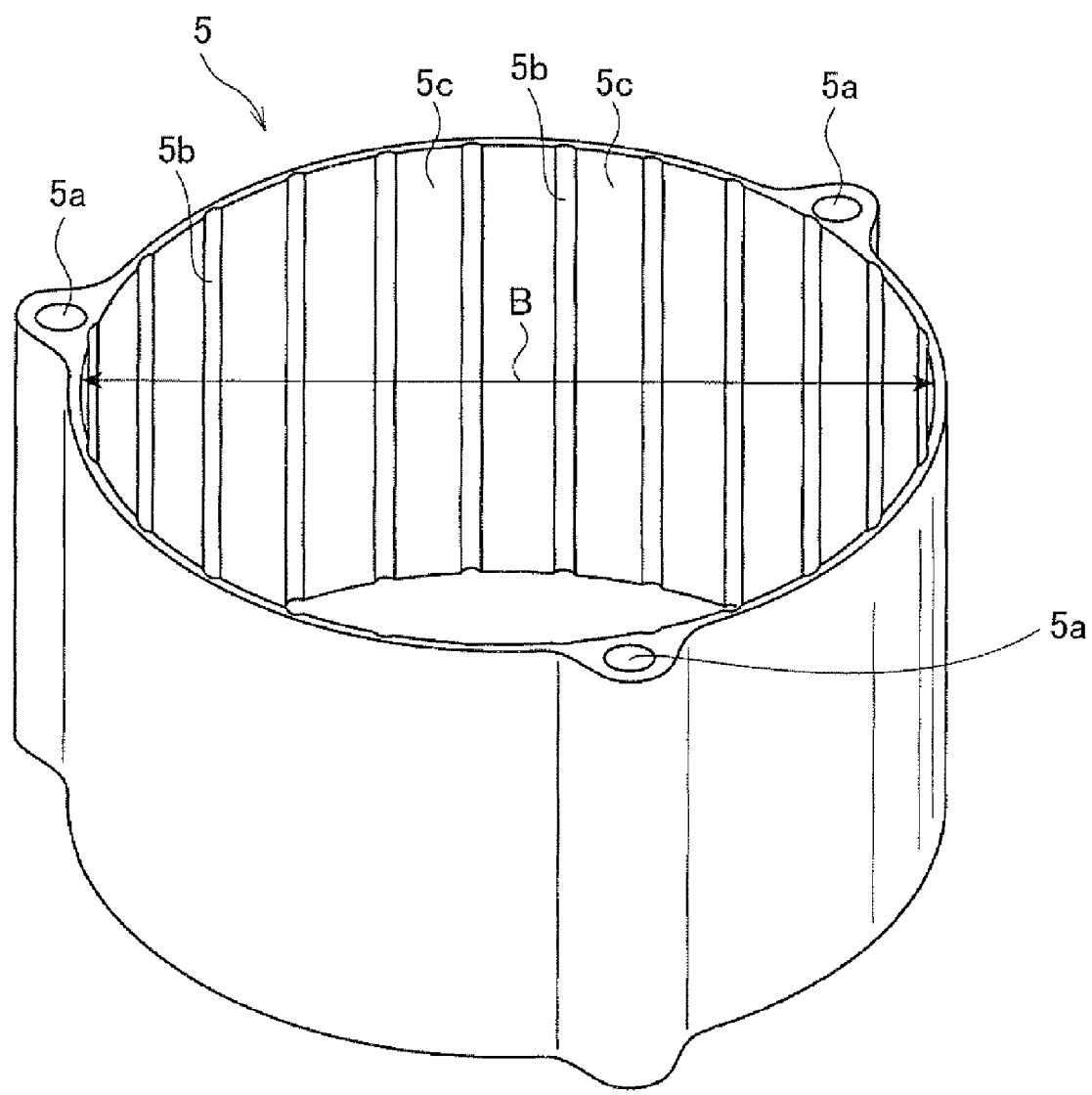
FIG. 12 is a perspective view of an outer casing of the stator according to the first embodiment of the invention.
Figure 13:
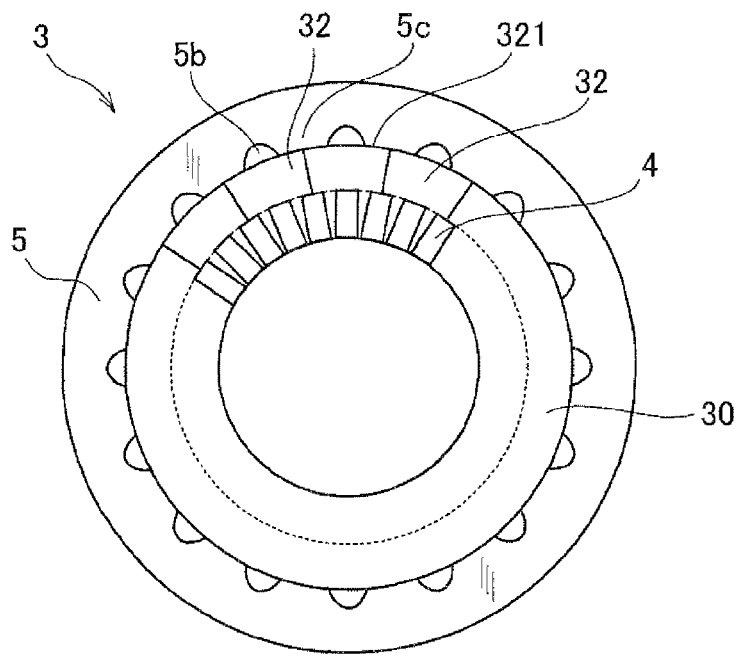
FIG. 13 is a schematic plan view of the stator according to the first embodiment of the invention.

FIG. 11 is a perspective view of a core assembly body 50 including the stator coil 4 (roll body 48) and the stator core 30 assembled to the stator coil 4. FIG. 12 is a perspective view of the outer casing 5 to be shrink-fitted into the core assembly body 50. FIG. 13 is a schematic plan view of the stator 3 including the core assembly body 50 into which the outer casing 5 is shrink-fitted.

As shown in FIG. 13, the back core portions 321 of the core pieces 32 laminated in the axial direction are seen on the side of the outer periphery of the core assembly body 50. The outer casing 5 of a cylindrical shape having a thickness of 2 mm is made of low carbon steel through which magnetic flux can pass. The outer casing 5 is formed with through holes 5a used to fix the stator 3 to the housing 10.

In this embodiment, when the outer diameter of the core assembly body 50 is A, the inner diameter of the outer casing 5 at normal temperature is B, and the inner diameter of the outer casing 5 when heated for shrink-fitting is C, the components of the stator 3 are manufactured to satisfy the relationship of C>A>B.

In the following description, the value of (A−B) is called "clamping margin". The clamping force between the outer casing 5 and the core assembly body 50 after the outer casing 5 is shrink-fitted into the core assembly body 50 and cooled to normal temperature increases with the increase of the clamping margin. However, if the clamping force becomes excessively large, there occur problems of increase of magnetic loss, deformation of the core pieces, variation of the core inner diameter, and degradation of the roundness of the stator core.

Accordingly, in this embodiment, the outer casing 5 is formed with slits 5b at the inner periphery thereof to provide gaps between the core assembly body 50 and the outer casing 5, so that the increase of the clamping force with the increase of the clamping margin becomes gentle. The slits 5b are formed at 24 (which is equal to the number of the core pieces) positions at even intervals so as to extend in the axial direction of the electric rotating machine 1. When the outer casing 5 is shrink-fitted into the outer periphery of the core assembly body 50, they are placed such that any of the slits 5 is not situated at the abutting portion between the adjacent core pieces (see FIG. 13).

Figure 14:
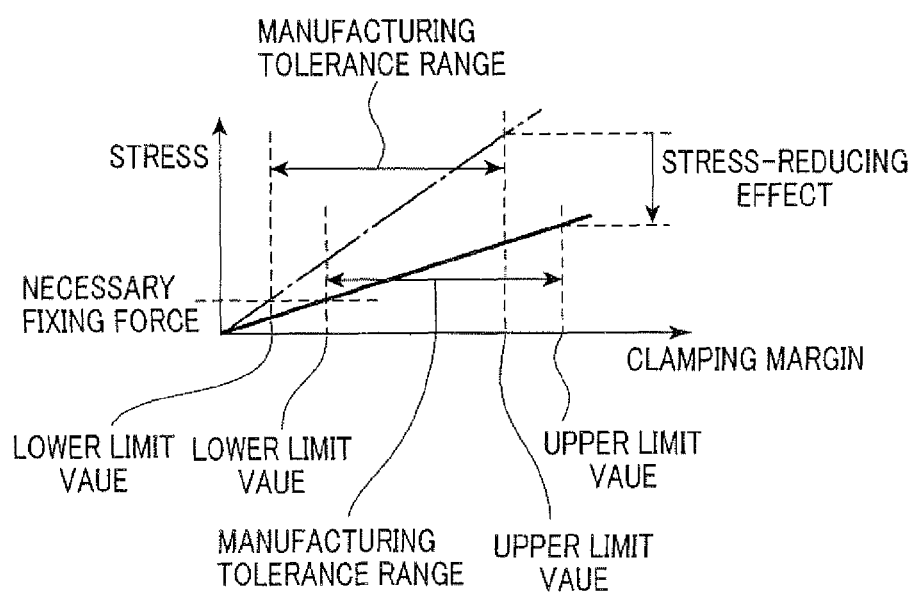
FIG. 14 is a graph showing the relationship between the clamping margin and the stress due to the clamping force applied between the core assembly body and the outer casing of the stator according to the first embodiment of the invention.

The advantageous effects of the provision of the slits 5b are explained below with reference to FIG. 14. FIG. 14 is a graph showing the relationship between the stress due to the clamping force applied between the core assembly body 50 and the outer casing 5 and the clamping margin. In this graph, the chain line shows a case where no slits 5b are formed on the inner periphery of the outer casing 5, and the solid line shows a case where the slits 5b are formed on the inner periphery of the outer casing 5. The horizontal axis represents the clamping margin, and the vertical axis represents the clamping force applied between the core assembly body 50 and the outer casing 5.

In FIG. 14, the minimum value of the clamping margin necessary to rigidly fix the core assembly body 50 and the outer casing 5 to each other is indicated as "lower limit value", and the clamping force at the time is indicated as "necessary fixing force". The value of the clamping margin larger than the lower limit value by the maximum value of the manufacturing tolerance range in this embodiment is indicated as "upper limit value". The manufacturing tolerance range has the same width for both the case where the slits 5b are formed and the case where the slits 5b are not formed.

As seen from the graph of FIG. 14, the increase of the stress with the increase of the clamping margin is sharp in the case where the slits 5b are not formed, while it is gentle in the case where the slits 5b are formed. Accordingly, according to this embodiment, the stress when the manufacturing tolerance is at its maximum can be reduced. This stress-reducing effect can eliminate the problems of increase of magnetic loss, deformation of the core pieces, variation of the core inner diameter and degradation of the roundness of the stator core.

As explained above, in this embodiment, the slits 5b are formed on the inner periphery of the outer casing 5 to provide gaps between the core assembly body 50 and the outer casing 5, and the core assembly body 50 and the outer casing 5 are positioned in the circumferential direction such that none of the slits 5 is situated at the abutting portion between the adjacent core pieces as shown in FIG. 13. As a result, since each abutting portion faces an abutting surface 5c of the inner periphery of the outer casing 5, it is possible to uniformly apply the clamping force to the core pieces while preventing the adjacent core pieces from slipping from each other. This also contributes to eliminating the problems of increase of magnetic loss, deformation of the core pieces, variation of the core inner diameter and degradation of the roundness of the stator core.

Also, in this embodiment, the gaps between the core assembly body 50 and the outer casing 5 are provided in the form of the slits 5b extending between the core assembly body 50 and the outer casing 5 in the axial direction. This makes it possible to pass cooling air or cooling water through the slits 5b to cool the outer casing 5.

Although the number of the slits 5b is the same as the number of the core pieces 32 (twenty four in this embodiment), it is not limited thereto. For example, the number of the slits 5b may be twice the number of the core pieces 32. In this case, it is possible to uniformly apply the inner periphery of the outer casing 5 to the abutting portions between the adjacent core pieces.

Furthermore, since the gaps are provided between the core assembly body 50 and the outer casing 5 by the specific shape of the inner periphery of the outer casing 5 it is not necessary to shape the core pieces 32 to have a specific shape. This makes it possible to avoid the magnetic circuit of the stator from being adversely affected.

Next, explanation is given of a method of manufacturing the stator 3 having the structure in which the outer casing 5 is shrink-fitted into the core assembly body 50 constituted of the stator coil 4 (roll body 48) and the stator core 30 assembled to stator coil 4. In the following, the term "radial direction" means the radial direction of the roll body 48 or the core member, and the term "circumferential direction" means the circumferential direction of the roll body 48 or the core member. This method includes the following steps.

A shaping step:

First, twelve shaped bodies are formed from twelve conductive wires. Each of the shaped bodies includes a plurality of straight portions 431 extending in parallel and arranged along the longitudinal direction of the shaped body, and a plurality of turn portions 44 connecting the adjacent straight portions 431 on the side of one end and the other end of the straight portions alternately.

An assembly step:

The twelve shaped bodies are assembled to one another to form the assembled body 47. The assembled body 47 includes six wire assemblies arranged along the longitudinal direction of the assembled body 47.

Each of the wire assemblies includes a first wire section as the first winding 40a and a second wire section as the second winding 40b. Each of the first and second wire sections is constituted of one of the shaped bodies.

In each of the wire members, the first and second wire sections are joined to each other by welding at their one ends to form their junction portion 45. The first and second wire sections are joined to each other for all the wire assemblies after the twelve shaped bodies are assembled to one another. Alternatively, the six wire members may be assembled to one another after they are formed by joining the first wire sections to the second wire sections.

Each of the wire assemblies of the assembled body 47 includes a plurality of straight overlap portions 471 arranged along the longitudinal direction of the assembled body 47, each of the straight overlap portions 471 being formed from the straight portions 431 of the first wire section and the straight portions 431 of the second wire section which are overlapped with one another. However, the six straight portions 431 of the turn-round portions 46 which are firstly rolled at the below described rolling step, and the six straight portions 431 which are lastly rolled at the below described rolling step are not overlapped with other straight portions 431.

A rolling step:

The assembled body 47 is rolled around the core member several turns (three of four turns, for example) to form the roll body 48 shown in FIG. 9. The rolling is performed while plastic-deforming the turn portions 44 of the assembled body 47 to within a predetermined rolling radius.

In this step, the turn portions 44 may be bent by use of a shaping die or a shaping roller. The details of the rolling step are explained in detail later.

The roll body 48 includes a plurality of straight laminate portions 481 arranged along the circumferential direction of the roll body 48, the straight laminate portions 481 being formed from the straight overlap portions of one wire assembly laminated in the radial direction by a number equal to the number of turns during rolling. In each of the straight laminate portions 481, the straight portions 431 as many as twice the number of the rolling turns are overlapped and aligned in the radial direction Also, the straight laminate portions 481 are disposed at small intervals along the circumferential direction of the roll body 48.

An assembly step:

Between each adjacent two of the straight laminate portions of the thus obtained roll body 48, the tooth portion 320 of the core piece 32 is inserted from radially outside, and the core pieces 32 are joined in a ring to obtain the core assembly body 50 (see FIG. 11).

A shrink-fitting process:

In this process, the core assembly body 50 (see FIG. 11) is inserted and fitted into the outer casing 5 (see FIG. 12). First, the outer casing 5 is heated to a predetermined temperature (300 degrees C., for example) by a not-shown heater. Subsequently, the core assembly body 50 is inserted into the heated outer casing 5, while circumferentially positioning them such that none of the slits 5b is situated at the abutting portions between each adjacent two of the core pieces 32. Thereafter, the outer casing 5 is cooled by a not-shown fan for about 30 minutes to complete the shrink-fitting process.

Second Embodiment

In the above described first embodiment, the gaps between the core assembly body 50 and the outer casing 5 are provided in the forms of the slits 5b. However, the present invention is not limited thereto. In the below described second embodiment, the gaps are formed by the shape of the outer periphery of the core assembly body 50.

Figure 15:
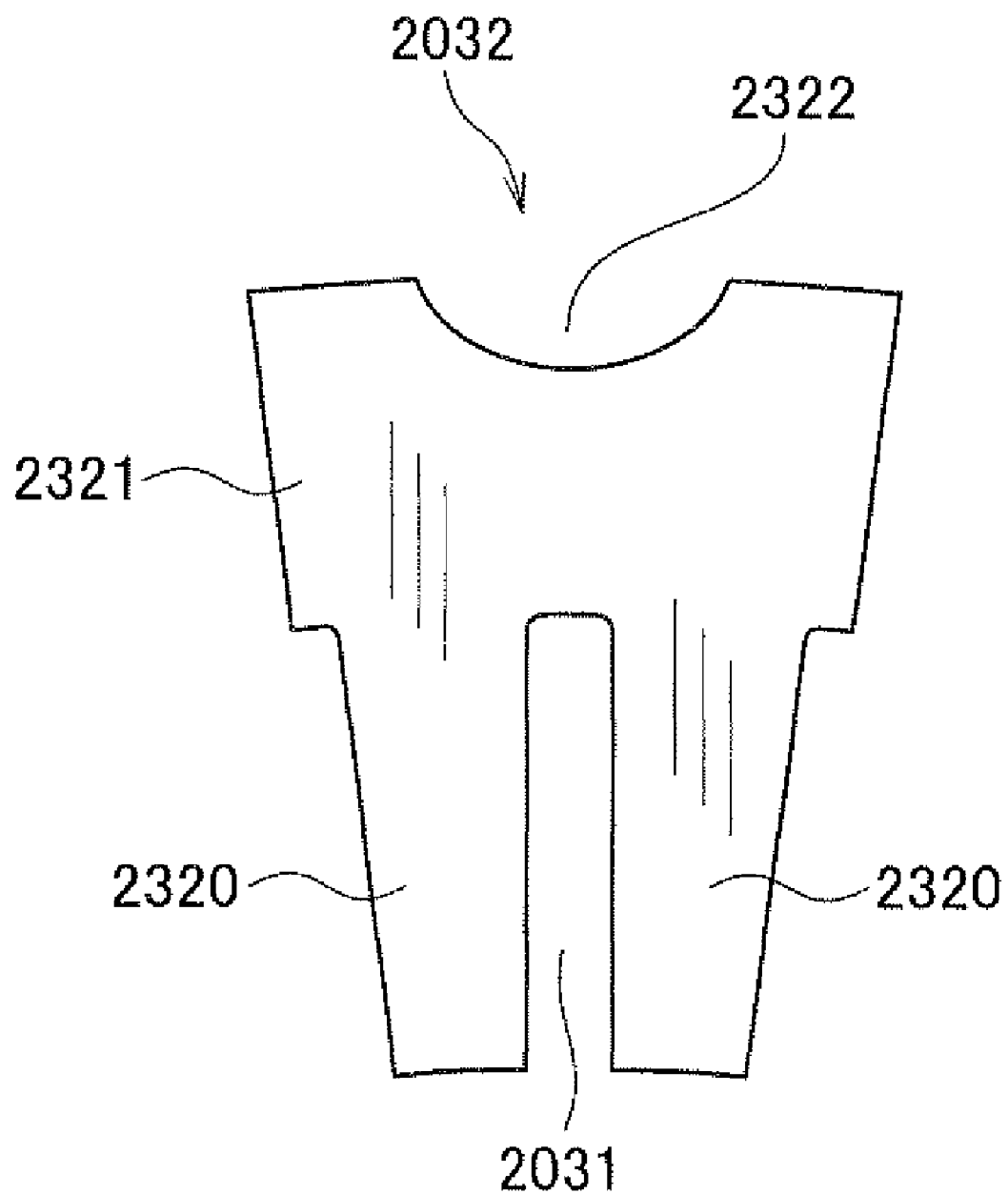
FIG. 15 is a plan view of one of core pieces constituting a stator core of a stator according to a second embodiment of the invention.

FIG. 15 is a plan view showing the shape of one of core pieces 2032 in the second embodiment.

The stator core of the second embodiment is constituted of a predetermined number of (twenty four in this embodiment) the core pieces 2032 joined in a ring. Each core piece 2032 defines one slot 2031, and another slot 2031 with the circumferentially adjacent slot 2032. The core piece 2032 is constituted including a pair of tooth portions 2320 extending radially inwardly, and a back core portion 2321 connecting these tooth portions 2320 at a radially outwardly position.

The core piece 2032 is formed with a recess 2332 at the upper edge of the back core portion 2321 thereof in order that a gap is formed between the core assembly body 50 and the outer casing 5. The second embodiment provides the stress-reducing effect similar to that provided by the first embodiment.

According to the second embodiment in which the gaps between the core assembly body 50 and the outer casing 5 are formed by the shape of the core assembly body 50, that is, by the shape of the core pieces, the stator having the stress-reducing effect can be manufactured at low cost, because it requires only that the laminated body of steel plates constituting the core pieces has a recess at the radially outer side thereof, and does not require any additional manufacturing step.

The gaps between the core assembly body 50 and the outer casing 5 may be formed by both the shapes of the outer periphery of the core assembly body 50 and the inner periphery of the outer casing 5.

The core assembly body 50 may be fitted into the outer casing 5 by performing taper fitting instead of shrink-fitting when necessary to achieve necessary clamping force. For example, the core assembly body 50 may be pressure-inserted into the outer casing 5 while inclining the abutting portion between the outer periphery of the core assembly body 50 and the inner periphery of the outer casing 5 with respect to the inserting direction.

The present invention is applicable to an electric rotating machine mounted on an electric vehicle, a hybrid vehicle and others.

The above explained preferred embodiments are exemplary of the invention of the present application which is described solely by the claims appended below. It should be understood that modifications of the preferred embodiments may be made as would occur to one of skill in the art.

What is claimed is:

1. A stator of an electric rotating machine comprising:
   a stator core constituted of a plurality of core pieces joined to one another in a ring;
   a plurality of phase windings wound in slots formed in said stator core along an inner periphery of said stator core;
   said stator core and said phase windings constituting a core assembly body; and
   an outer casing into which said core assembly body is fitted;
   wherein gaps are provided between an outer periphery of said core assembly body and an inner periphery of said outer casing, each of said gaps being located at a position equidistant from abutting surfaces of corresponding adjacent two of said core pieces, and outwardly opposite to a corresponding one of said slots in a radial direction of said stator core; and
   wherein said gaps are provided such that none of said gaps faces an abutting portion between any adjacent two of said core pieces.

2. The stator according to claim 1, wherein said gaps are slits extending in an axial direction of said stator between said core assembly body and said outer casing.

3. The stator according to claim 2, wherein the number of said gaps is equal to an integral multiple of the number of said core pieces connected to one another in a ring.

4. The stator according to claim 1, wherein said gaps are formed by a shape of said outer periphery of said core assembly body.

5. The stator according to claim 1, wherein said gaps are formed by a shape of said inner periphery of said outer casing.

6. The stator according to claim 1, wherein said core assembly body and said outer casing are shrink-fitted to each other.

* * * * *